US010759428B2

(12) United States Patent
Kahn et al.

(10) Patent No.: US 10,759,428 B2
(45) Date of Patent: Sep. 1, 2020

(54) USE OF LASER SCANNER FOR AUTONOMOUS TRUCK OPERATION

(71) Applicant: PACCAR Inc, Bellevue, WA (US)

(72) Inventors: William C. Kahn, Denton, TX (US); A. Brent Hankins, Dallas, TX (US)

(73) Assignee: PACCAR INC, Bellevue, WA (US)

(*) Notice: Subject to any disclaimer, the term of this patent is extended or adjusted under 35 U.S.C. 154(b) by 92 days.

(21) Appl. No.: 15/694,564

(22) Filed: Sep. 1, 2017

(65) Prior Publication Data
US 2017/0361844 A1 Dec. 21, 2017

Related U.S. Application Data

(62) Division of application No. 14/745,165, filed on Jun. 19, 2015, now abandoned.

(51) Int. Cl.
B60W 30/00 (2006.01)
B60W 30/18 (2012.01)
(Continued)

(52) U.S. Cl.
CPC ......... B60W 30/18036 (2013.01); B60D 1/30 (2013.01); B60D 1/481 (2013.01);
(Continued)

(58) Field of Classification Search
USPC ......................................................... 701/23
See application file for complete search history.

(56) References Cited

U.S. PATENT DOCUMENTS 5,646,614 A 7/1997 Abersfelder et al.
6,151,539 A 11/2000 Bergholz et al.
(Continued)

FOREIGN PATENT DOCUMENTS

DE 100 49 229 A1 5/2002
DE 10 2005 058 628 A1 6/2007
(Continued)

OTHER PUBLICATIONS

Supplementary European Search Report dated Jan. 25, 2019, issued in corresponding European Application No. 16812467.5, filed Jun. 16, 2016, 8 pages.
(Continued)

Primary Examiner — James M McPherson

(57) ABSTRACT

A vehicle includes one or more laser scanners and an on-board vehicle computer system communicatively coupled to the laser scanners. The computer system uses information (e.g., coordinate points) obtained from the laser scanners to calculate a trailer angle (e.g., a cab-trailer angle) for the vehicle. The computer system may include a shape detection module that detects a trailer based on the information obtained from the laser scanners and an angle detection module that calculates an angle of the detected trailer relative to a laser scanner, calculates the orientation of the detected trailer based on that angle and dimensions (e.g., width and length) of the trailer, and calculates a cab-trailer angle based on the orientation of the trailer. The computer system may include an autonomous operation module configured to use the cab-trailer angle in an autonomous or computer-guided vehicle maneuver, such as a parking maneuver or backing maneuver.

20 Claims, 5 Drawing Sheets

(51) Int. Cl.
*G01B 11/26* (2006.01)
*G01B 11/24* (2006.01)
*B60W 30/06* (2006.01)
*B60D 1/30* (2006.01)
*B60D 1/62* (2006.01)
*B60D 1/48* (2006.01)

(52) U.S. Cl.
CPC ............... *B60D 1/62* (2013.01); *B60W 30/06* (2013.01); *G01B 11/24* (2013.01); *G01B 11/26* (2013.01); *B60W 2300/14* (2013.01); *B60W 2420/62* (2013.01); *B60W 2520/22* (2013.01)

(56) References Cited

U.S. PATENT DOCUMENTS

| | | |
|---|---|---|
| 6,484,080 B2 | 11/2002 | Breed |
| 6,672,745 B1 | 1/2004 | Bauer et al. |
| 7,049,945 B2 | 5/2006 | Breed et al. |
| 7,230,640 B2 | 6/2007 | Regensburger et al. |
| 7,852,462 B2 | 12/2010 | Breed et al. |
| 7,979,172 B2 | 7/2011 | Breed |
| 8,050,863 B2 | 11/2011 | Trepagnier et al. |
| 8,692,687 B2 | 4/2014 | Ghisio et al. |
| 8,874,267 B1 | 10/2014 | Dolgov et al. |
| 9,374,562 B2 | 1/2016 | Trombley et al. |
| 2011/0210529 A1 | 9/2011 | Markstaller |
| 2014/0104051 A1 | 4/2014 | Breed |
| 2014/0160276 A1 | 6/2014 | Pliefke et al. |
| 2014/0214255 A1 | 7/2014 | Dolgov et al. |
| 2015/0293216 A1 | 10/2015 | O'Dea et al. |
| 2016/0078220 A1 | 3/2016 | Scharf et al. |
| 2016/0101811 A1 | 4/2016 | Kyrtsos et al. |
| 2016/0129939 A1 | 5/2016 | Singh et al. |
| 2017/0320520 A1* | 11/2017 | Greul ................. B62D 13/00 |

FOREIGN PATENT DOCUMENTS

| | | |
|---|---|---|
| DE | 10 2012 006 738 A1 | 10/2013 |
| EP | 2 487 454 A2 | 8/2012 |
| JP | 06-278640 A | 10/1994 |
| JP | 08-332973 A | 12/1996 |
| JP | 2001-191964 A | 7/2001 |
| JP | 2002-243423 A | 8/2002 |
| WO | 2004/021546 A2 | 3/2004 |
| WO | 2009/077220 A1 | 6/2009 |
| WO | 01/85491 A1 | 11/2011 |

OTHER PUBLICATIONS

International Search Report dated Oct. 27, 2016, issued in corresponding International Application No. PCT/US2016/037927, filed Jun. 16, 2016, 2 pages.
Written Opinion dated Oct. 27, 2016, issued in corresponding International Application No. PCT/US2016/037927, filed Jun. 16, 2016, 3 pages.
"Driving Commercial Vehicles: A Guide for Professional Drivers," Insurance Corporation of British Columbia, Vancouver, Canada, Chap. 5, "Skills for Driving Trucks and Trailers," 2014, pp. 75-84.
Quain, J.R., "If a Car Is Going to Self-Drive, It Might as Well Self-Park, Too," The New York Times, Jan. 22, 2015, <http://www.nytimes.com/2015/01/23/automobiles/if-a-car-is-going-to-self-drive-it-might-as-well-self-park-too.html> [retrieved Feb. 3, 2015], 4 pages.
Saboune, J., et al., "A Visual Blindspot Monitoring System for Safe Lane Changes," Proceedings of the 16th International Conference, Image Analysis and Processing (ICIAP 2011), Ravenna, Italy, Sep. 14-16, 2011, Part II, vol. 6979, "Lecture Notes in Computer Science," pp. 1-10.
Australian Exam Report in Application No. 2016278231, dated Jan. 31, 2020, 5 pages.
European Office Action in Application No. 16812467.5, dated Jul. 8, 2020, 3 pages.

* cited by examiner

USE OF LASER SCANNER FOR AUTONOMOUS TRUCK OPERATION

CROSS-REFERENCE TO RELATED APPLICATION

This application is a division of application Ser. No. 14/745,165, filed Jun. 19, 2015, the disclosure of which is incorporated herein by reference in its entirety.

BACKGROUND

Vehicles with articulation points pose difficult challenges for operators. As an example, in a semi-trailer truck configuration with an articulation point between a tractor and a trailer, the operator must carefully monitor the angle between the tractor and the trailer when backing up, in order to successfully achieve the desired position and orientation of the vehicle and avoid jackknifing. Similar challenges may face operators of articulated buses, light-duty trucks with trailers (e.g., boat/vehicle trailers, cargo trailers, etc.), or the like. Traditionally, operators must develop the necessary skills for operating such vehicles over long periods of training, and must monitor the angle of the trailer via rear-view mirrors during operation. For operators of any skill level, and especially lower skill levels, a greater level of precision and reduced reliance on visual monitoring is desirable.

With recent advances in technology, autonomous vehicles (such as so-called "driverless cars") are becoming more viable. However, articulation points pose special challenges for autonomous vehicles, as well.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a vehicle comprises one or more laser scanners and an on-board vehicle computer system communicatively coupled to the laser scanners. The computer system is configured to use information (e.g., coordinate points) obtained from the laser scanners to calculate a cab-trailer angle for the vehicle. The computer system may include a shape detection module configured to detect a trailer based at least in part on the information obtained from the laser scanners. The computer system may include an angle detection module. The angle detection module may be configured to calculate an angle of the detected trailer relative to the laser scanner, calculate the orientation of the detected trailer based on that angle and dimensions (e.g., width and length) of the trailer, and calculate the cab-trailer angle based at least in part on the orientation of the trailer. The computer system may include an autonomous operation module configured to use the cab-trailer angle in an autonomous or computer-guided vehicle maneuver, such as a parking maneuver or backing maneuver. The laser scanners may be mounted on the side or rear of the vehicle.

In another aspect, a vehicle comprises a tractor unit, a plurality of laser scanners (e.g., at least two side-mounted scanners) mounted to the tractor unit, and an on-board vehicle computer system communicatively coupled to the laser scanners. The computer system is configured to use coordinate point information obtained from at least one of the laser scanners to calculate a cab-trailer angle for the vehicle in a single-trailer or multi-trailer configuration or a trailer-trailer angle for the vehicle in a multi-trailer configuration. The computer system may include an autonomous operation module configured to use the cab-trailer angle or the trailer-trailer angle to perform an autonomous or computer-guided vehicle maneuver. The computer system may include a shape detection module configured to detect one or more trailers based at least in part on the information obtained from the at least one laser scanner. The computer system may include an angle detection module configured to calculate the cab-trailer angle or the trailer-trailer angle based at least in part on an orientation of the detected trailer.

In another aspect, a computer-readable storage medium includes instructions configured to cause a vehicle computer system to detect a trailer based at least in part on information obtained from a laser scanner mounted on a vehicle, calculate an orientation of the detected trailer, and calculate a trailer angle for the vehicle based at least in part on the orientation of the detected trailer. The instructions may be further configured to cause the vehicle computer system to cause the vehicle to perform an autonomous vehicle maneuver based at least in part on the trailer angle.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

The detailed description set forth below in connection with the appended drawings is an illustrative and non-limiting description of various embodiments of the disclosed subject matter. The following description proceeds with reference to examples of computer systems and methods suitable for use in vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

Examples described herein provide enhanced vehicle operation and object detection capabilities with light-based remote-sensing technology. As used herein, the term LiDAR (also known as light radar or light detection and ranging) is used to refer generally to light-based remote sensing technology. Laser scanners are devices that use LiDAR technology for remote sensing. The laser scanners described herein may employ any suitable known or future-developed LiDAR technology to perform functions described herein.

It should be understood that various embodiments of the present disclosure include logic and operations performed by electronic components. These electronic components, which may be grouped in a single location or distributed over a wide area, generally include processors, memory, storage devices, display devices, input devices, sensors, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. A controller area network (CAN) bus can be used to communicate vehicle operating conditions as specified by the Society of Automotive Engineers (SAE) J1939 standard.

Figure 1:
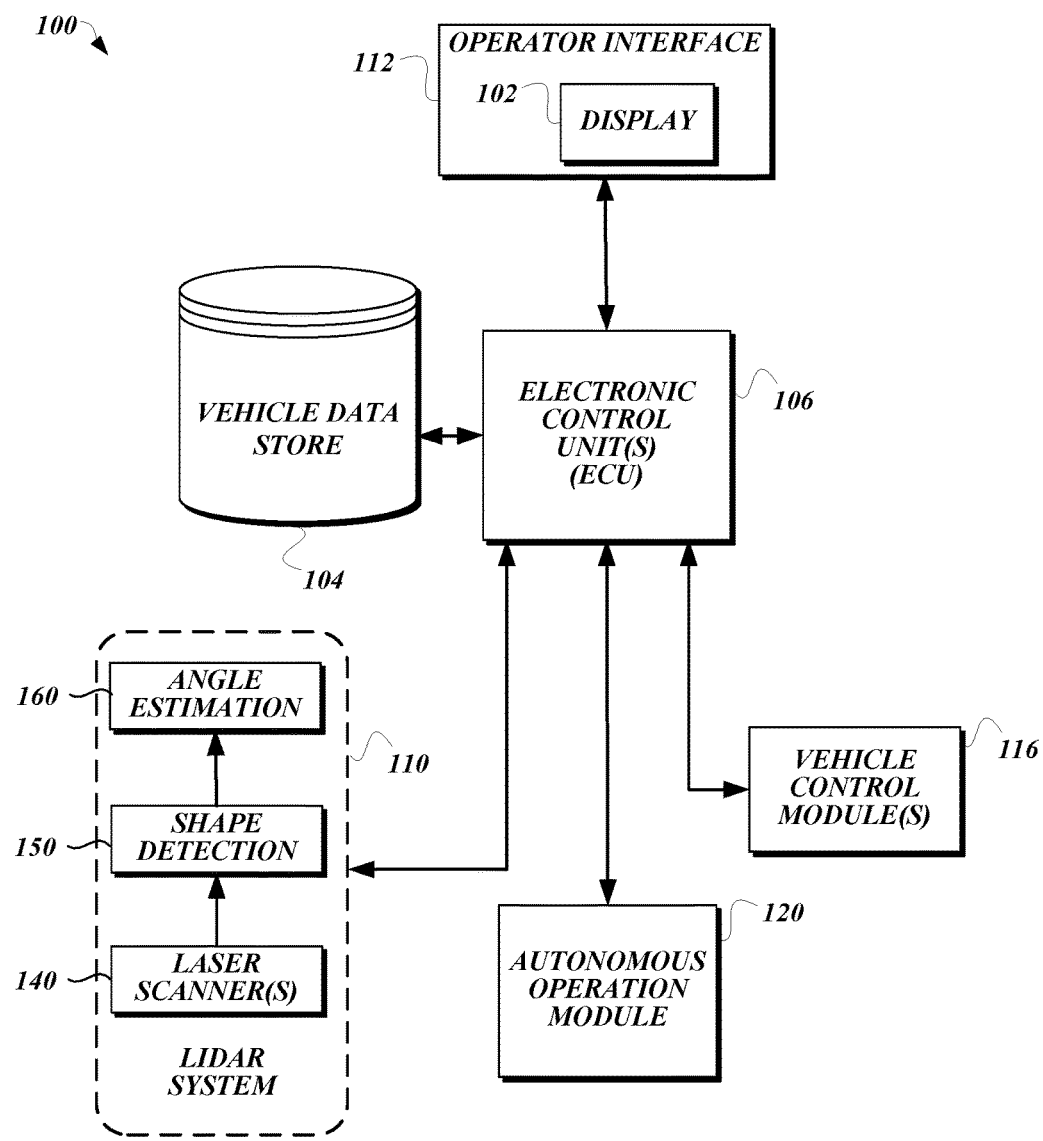
FIG. 1 is a schematic diagram of an illustrative on-board vehicle computer system with a LiDAR system in accordance with the present disclosure.

FIG. 1 illustrates one embodiment of a vehicle computer system 100 according to various aspects of the present disclosure. The system 100 includes at least one electronic control unit (ECU) 106. ECUs are embedded devices that control electronic systems or subsystems in vehicles. Although only one ECU is shown in FIG. 1 for ease of illustration, vehicle computer systems may include many ECUs, some of which may be dedicated to controlling specific vehicle systems or subsystems. ECUs can be implemented in a variety of hardware, software, and combination hardware/software configurations, for carrying out aspects of the present disclosure. A typical ECU includes a processor (e.g., a microcontroller), memory, and one or more communication links. The memory may include an electronically erasable, programmable, read-only memory ("EEPROM") or other non-volatile memory (e.g., flash memory) and/or random access memory ("RAM"). The memory may include program instructions in the form of modules, applications, and/or the like that are executable by the processor. In particular, the memory may include program instructions that implement functionality of the system 100.

The ECU 106 communicates with an operator interface 112 comprising an operator display 102. The operator display 102 may include any type of display (e.g., an LCD display) used in a vehicle to convey information (e.g., trailer angle information, blindspot object detection information, or other vehicle information) to the operator. The operator display 102 may include special purpose lighted displays, needle gauges, and/or the like. In some configurations, such as a touchscreen configuration, the operator display 102 may have input capabilities in addition to output capabilities. The operator interface 112 also may include other input devices including buttons, toggles, keyboards, mechanical levers, and any other devices that allow an operator to provide input to the system 100. The operator interface 112 also may include other output devices such as speakers or haptic feedback devices to provide information to the operator.

The ECU 106 is communicatively coupled to a LiDAR system 110. In the example shown in FIG. 1, the LiDAR system 110 obtains information from one or more laser scanners 140 to facilitate calculation of a trailer angle, as described in further detail below. For a truck, a trailer angle can be calculated, for example, between a trailer and a tractor unit or between a first trailer and a second trailer in a multi-trailer configuration. In the example shown in FIG. 1, the LiDAR system 110 includes a shape detection module 150 that implements a shape detection algorithm. The shape detection module 150 allows the LiDAR system 110 to detect a trailer, and may provide the ability to detect other objects, as well. The LiDAR system also includes an angle estimation module 160 that implements an angle estimation algorithm. The shape detection module 150 can generate output in the form of coordinate points (e.g., coordinate points associated with a trailer or other object). The LiDAR system 110 may use the shape detection module 150 to distinguish coordinate points associated with a trailer from coordinate points associated with some other object, such as another vehicle or an obstacle to be avoided. The LiDAR system 110 can take output from the shape detection module 150 and provide it as input to the angle estimation module 160. The angle estimation module 160 allows the LiDAR system to calculate cab-trailer angles (e.g., angles between tractor units and trailers of a truck), trailer-trailer angles (e.g., angles between connected trailers in a multi-trailer configuration), or the like. Illustrative techniques for calculating trailer angles are described in further detail below.

The LiDAR system 110 can be used in combination with other modules or subsystems to provide enhanced functionality for the vehicle. In the example shown in FIG. 1, the LiDAR system is communicatively coupled to an autonomous operation module 120 via the ECU 106. The autonomous operation module 120 provides functionality for autonomous or computer-guided truck operations. In autonomous operations, such as a fully-automated backing or parking maneuver, no operator action may be required to complete the operation. In computer-guided operations, the operator may receive guidance (e.g., via display 102) as to how the operation (such as a backing maneuver) may be completed, such as guidance directed to how to steer the tractor unit of a truck in a particular way to complete the operation.

In the example shown in FIG. 1, the autonomous operation module receives input from the LiDAR system 110. Input received by the autonomous operation module 120 may include, for example, shape detection information, trailer angles, trailer dimensions, or the like. For example, the autonomous operation module 120 may use trailer dimensions and a calculated trailer angle to make a prediction for the location of the extents and path of a trailer during a maneuver. Such predictions can be used, for example, in safety algorithms or route-planning algorithms to prevent the vehicle or trailer from coming into contact with objects (such as buildings, walls, gates, road signs, or the like) or entering hazardous areas, such as a severely sloped area. If wheel locations or trailer axle locations are provided for a specific trailer, such predictions also could be used to track the expected path of specific wheels to avoid driving the wheels into hazardous areas. For backing maneuvers, the estimated location of the back of the trailer could be used in an algorithm configured to place the trailer in a desired location (e.g., at a loading dock) while avoiding obstacles (such as other parked trailers), hazardous areas, etc.

The LiDAR system 110 also can be used for other purposes. For example, the front surface of a trailer can be recognized to allow a tractor unit to center the fifth wheel on the kingpin to allow autonomous mating to the trailer. As another example, trailer angle calculations can be used in a jackknife prevention system to provide a warning or actively intervene (e.g., by braking) if a jackknife is imminent by using the trailer angle to determine if the trailer body will come into contact with the tractor cab.

In the example shown in FIG. 1, the LiDAR system is communicatively coupled to one or more vehicle control modules 116 via the ECU 106. The modules 116 may include an ABS/stability control module, a blindspot detection or another object detection module, or other vehicle control modules. The LiDAR system may provide additional functionality when combined with such modules in the system 100. For example, the LiDAR system may provide trailer angle information that an ABS/stability control module can use to determine if a trailer is sliding out of parallel with the truck. The ABS/stability control module can then take action (such as braking or reducing engine power) to mitigate the risk of such an event.

The ECU 106 also may be communicatively coupled to one or more other sensors, modules, or subsystems (not shown) that may provide other control capabilities or information concerning the status of the vehicle. For example, a GPS module or other vehicle positioning module can be used in combination with the LiDAR system 110 to facilitate route-planning for autonomous or computer-guided vehicle operation.

The illustrated ECU 106 is also communicatively coupled to a vehicle data store 104, which may be used to store laser scanner data or other vehicle data. Although the vehicle data store 104 is depicted a single data store separate from other components of the system 100 for ease of illustration, vehicle data may be distributed among various data stores within the system, including in memory in the ECUs 106 or in other locations. Any suitable computer-readable storage medium, such as an EEPROM, flash memory, hard disk, or the like may be used. Data stored in the vehicle data store may include, for example, vehicle data that can be sensed and stored during vehicle operation, as well as system settings, which may be default settings or customizable settings that can be set by the vehicle manufacturer, the owner, the operator, or any other suitable entity.

Components described herein may be communicatively coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed in-vehicle communication systems without departing from the scope of the claimed subject matter.

Although the system 100 is depicted as an on-board vehicle computer system to illustrate one category of usage scenarios, other configurations are possible. A suitably equipped vehicle may communicate with other computer systems, e.g., via a WiFi or cellular network. Such systems may provide remote data processing and storage services, remote diagnostics services, or other services that can be used in combination with the systems and techniques described herein. For example, the system 100 may communicate with a remote geolocation or positioning system to facilitate autonomous or computer-guided vehicle operation. As another example, the system 100 may transmit status information (e.g., for the LiDAR system 110) to a remote diagnostics system to allow the remote diagnostics system to determine whether components of the system 100 (e.g., LiDAR system 110) or other vehicle systems are operating correctly.

Many alternatives to the vehicles and systems described herein are possible. Although illustrative details of vehicle computer systems are described with reference to FIG. 1, it should be understood that alternative systems and methods can be implemented and used in accordance with the present disclosure. For example, although the LiDAR system 110 is depicted in FIG. 1 as including a shape detection module and an angle estimation module, this is not required. Shape detection and angle estimation can be performed within the LiDAR system 110 or somewhere else, such as in the autonomous operation module 120. In such a configuration, the LiDAR system 110 may provide coordinate point information to the autonomous operation module 120, a blindspot object detection module (not shown), or some other module to perform any necessary calculations.

Further, it should be understood that, in practice, a fully-functional vehicle computer system may have additional components (e.g., sensors, control modules, output devices, input devices, and the like) that are not shown in FIG. 1 for ease of illustration.

Detailed examples are now described with reference to FIGS. 2-7. However, it should be understood that alternative systems and methods can be implemented and used in accordance with the present disclosure.

Figure 2:
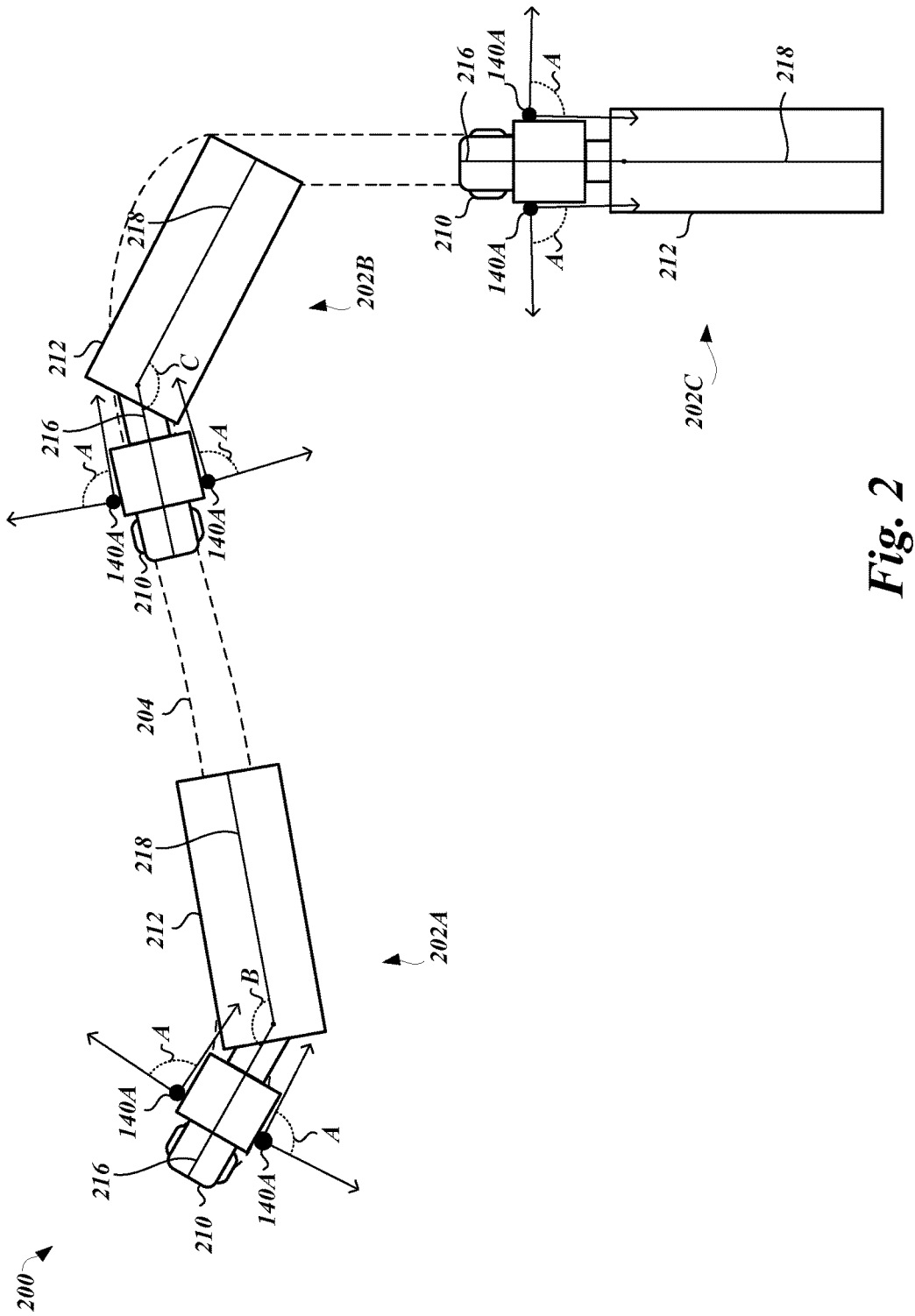
FIGS. 2 and 3 are schematic diagrams of an illustrative autonomous or computer-guided truck maneuver that can be performed by a truck with a LiDAR system in accordance with the present disclosure.
Figure 3:
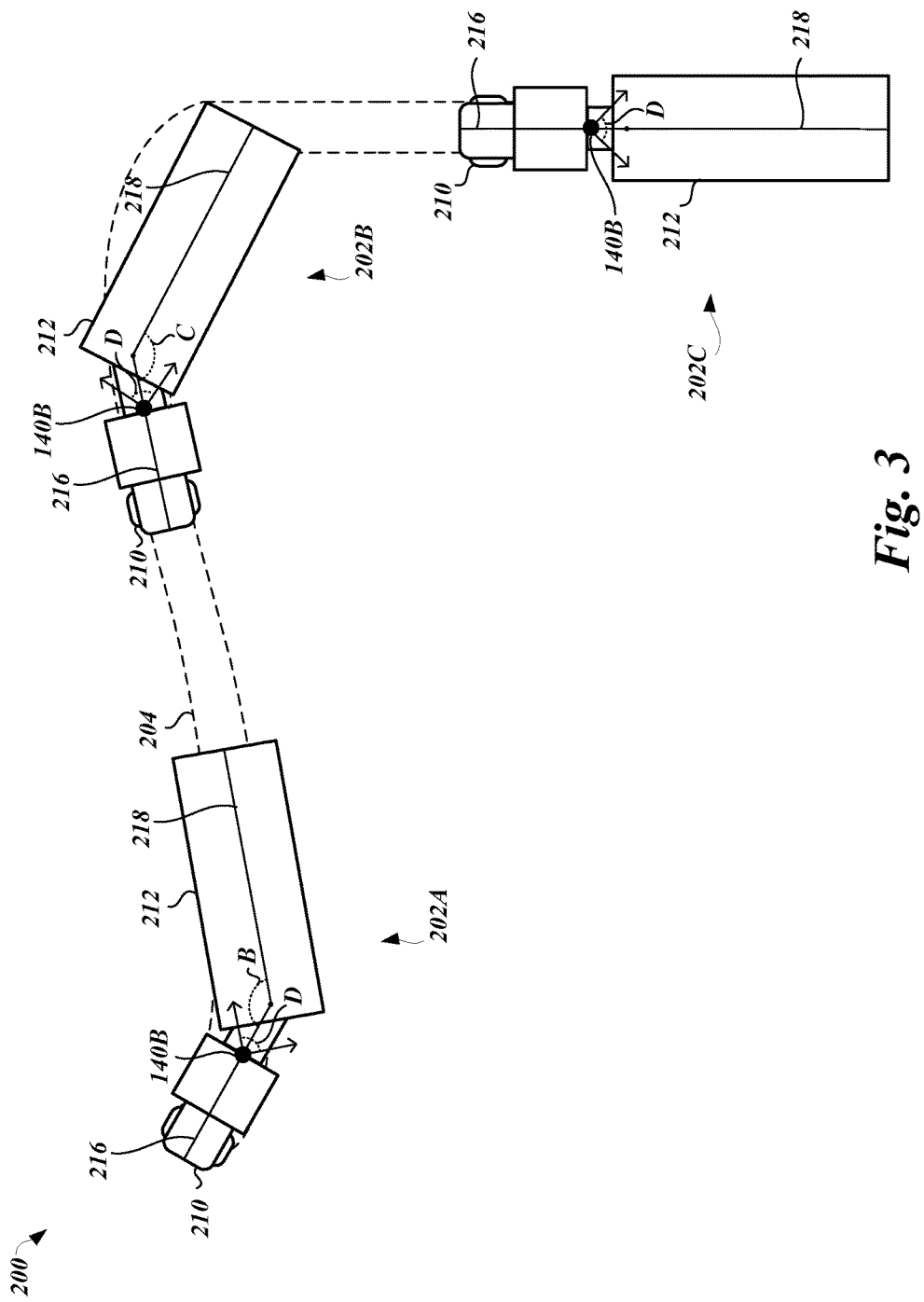

As mentioned above, a LiDAR system can be used to facilitate autonomous or computer-guided truck operation. FIGS. 2 and 3 are schematic diagrams of an illustrative autonomous or computer-guided truck maneuver that can be performed by a truck with a LiDAR system in accordance with the present disclosure. As shown, a tractor unit 210 with a connected trailer 212 performs a backing maneuver 200 along a path 204 in which the cab-trailer angle between the tractor unit 210 and the trailer 212 changes during the maneuver. In the examples shown in FIGS. 2 and 3, the cab-trailer angles B and C are illustrated relative to a center line 216 of the tractor unit 210 and a center line 218 of the trailer 212.

The tractor unit 210 may have one or more LiDAR devices (e.g., 2D or 3D laser scanners) in a LiDAR system that can be used to detect the cab-trailer angle during the backing maneuver 200 or some other maneuver. In at least one embodiment, 2D laser scanners are used, and laser light from the scanners is emitted in a plane to provide two-dimensional positioning information. Alternatively, 3D laser scanners can be used to provide three-dimensional positioning information. 3D laser scanners may be beneficial in scenarios such as detecting flatbed trailers or other lower profile trailers, or for driving over uneven ground. Or, 2D and 3D laser scanners can be used in combination. Laser scanners can be mounted in a variety of locations. In the example shown in FIG. 2, the tractor unit 210 has a side-mounted scanner 140A mounted on each side of the cab (e.g., on left and right rear-view mirrors or some other location). In the example shown in FIG. 3, the tractor unit 210 has a rear-mounted scanner 140B mounted on the rear of the cab (e.g., at a height that provides unobstructed scanning of the front of the trailer 212). In the example shown in FIG. 4, the tractor unit 210 has a side-mounted scanner 140A mounted on each side of the cab and a rear-mounted scanner 140B mounted on the rear of the cab. Other locations are also possible. For example, scanners may be mounted higher or lower on the tractor unit. Referring to FIG. 3, a scanner may be mounted on the rear portion of the roof of the cab for an alternative scanning vantage point. A roof-mounted scanner may be positioned, as an example, in the approximate X/Y location represented by rear-mounted scanner 140B, but at a higher position on the rear of the cab.

In practice, the specific locations chosen for scanners may depend on the specific objects to be detected (e.g., flatbed trailer, box trailer, tank trailer, etc.), the type of scanner used, or other factors. If angles for multiple trailers are to be detected, such as angles E and F in the examples shown in FIG. 5, side-mounted scanners 140A may be preferred over a single rear-mounted scanner. However, as shown in FIG. 6, it is also possible to mount a rear-mounted scanner 140B on both the tractor unit 210 and the first trailer 212A in a multi-trailer configuration to provide angle detection functionality that can cover both the first trailer 212A and a second trailer 212B.

Referring again to the example shown in FIG. 2, at position 202A of the maneuver 200, the cab-trailer angle B is detected based on information received from one or both of the side-mounted scanners 140A. As the truck proceeds in the backing maneuver to position 202B, the cab-trailer angle gradually changes to angle C. The cab-trailer angle continues to change as the truck proceeds in the backing maneuver to position 202C, where the tractor unit 210 and trailer 212 are in alignment at the desired location (e.g., a loading dock, parking space, or the like). Depending on the physical characteristics of the tractor unit 210 and the trailer 212, the orientation or positioning of the side-mounted scanners 140A, or other factors, cab-trailer angle may be detected by either or both of the side-mounted scanners 140A individually, or by both side-mounted scanners 140A working in combination, which may provide additional coordinate points and more accurate results. Referring again to the example shown in FIG. 3, changes in the cab-trailer angle during the backing maneuver can be detected based on information received from the rear-mounted scanner 140B. The configuration shown in FIG. 4, which includes both side-mounted scanners 140A and a rear-mounted scanner 140B, may be well suited for detecting trailer angles in both single-trailer and multi-trailer configurations.

Figure 4:
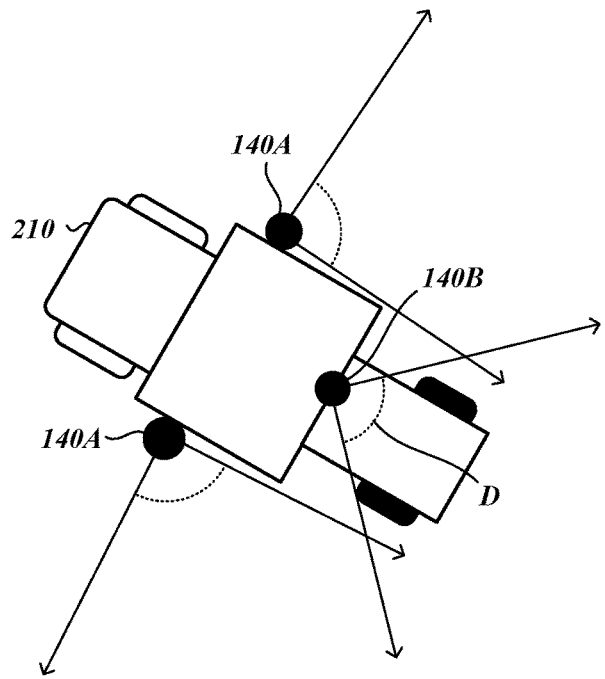
FIGS. 4-6 are top views of illustrative vehicles with laser scanners in accordance with the present disclosure.
Figure 5:
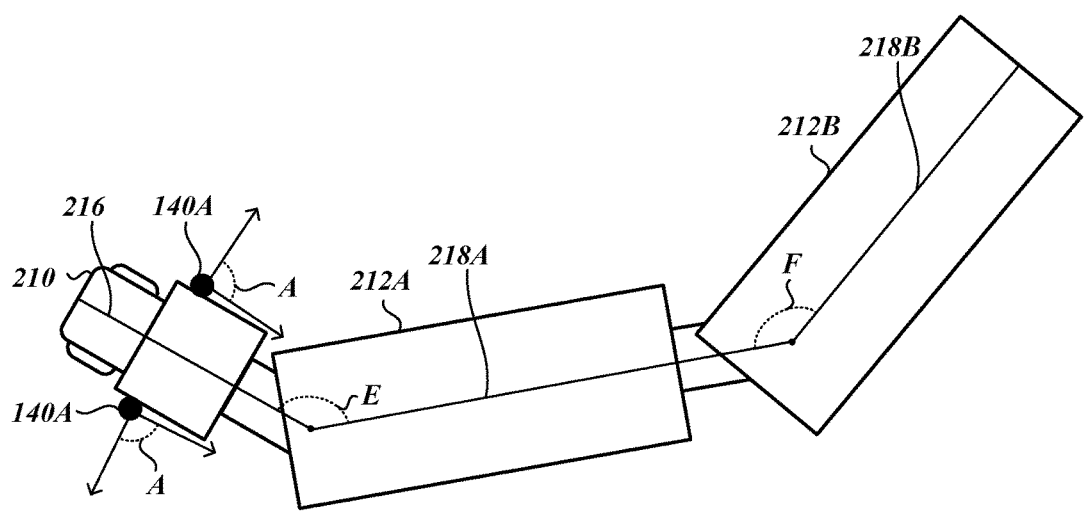
Figure 6:
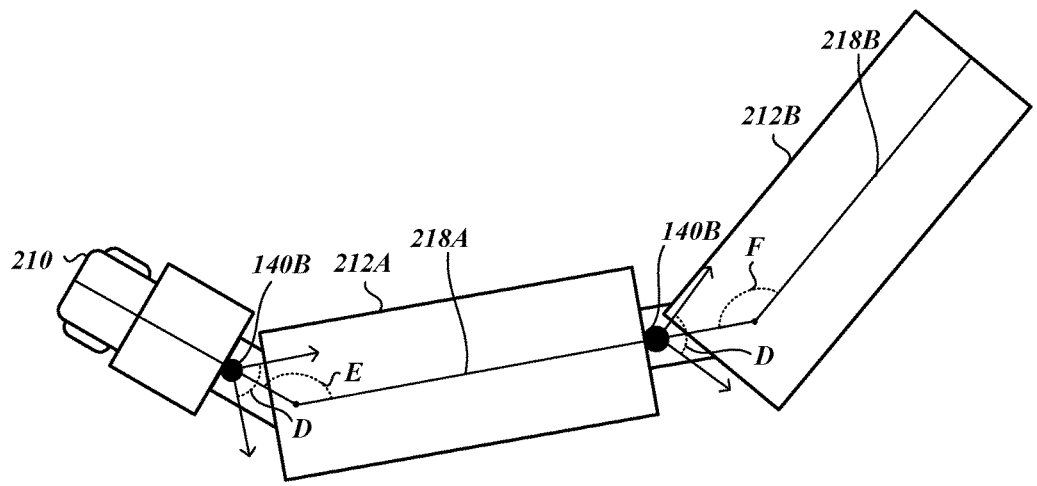

In the examples shown in FIGS. 2, 4, and 5, the side-mounted scanners 140A emit laser light in a range represented by angle A. In the examples shown in FIGS. 3, 4, and 6, the rear-mounted scanner 140B emits laser light in a range represented by angle D, which may be the same as or different than the angle A shown in FIGS. 2, 4, and 5. In practice, the angles A and D may be wider or narrower depending on the type of scanner used, how the respective scanners are positioned or configured, or other factors.

In the examples shown in FIGS. 2-6, the laser scanners 140A, 140B perform scans and produce output in the form of coordinate values (e.g., x- and y-coordinates for 2D laser scanners, and x-, y-, and z-coordinates for 3D laser scanners). The scans may involve steering a laser beam (e.g., with moveable mirrors) in a predetermined scanning motion (e.g., in the ranges represented by angles A and D). The scans are typically performed multiple times per second, and each scan may produce many coordinate points (e.g., hundreds of coordinate points per scan). Referring to the examples shown in FIGS. 2-6, the points may be located at the front and/or sides of the trailer, depending on the location of the scanners being used. Other scanner locations (e.g., the roof of the cab) may be better suited for identifying points located in other areas, such as the top of the trailer.

The particular scanning technique that is used, the scan frequency, and the number of coordinate points per scan may vary depending on factors such as on the particular scanners used, the configuration of the particular scanners used. For example, 2D laser scanners may produce coordinate points along a single scan line. On the other hand, the number of coordinate points may be multiplied for 3D laser scanners that produce coordinate points along multiple scan lines.

In at least one embodiment, the LiDAR system uses a shape detection algorithm to distinguish coordinate points associated with the trailer 212 from coordinate points associated with some other object, such as a feature of the tractor unit 210 or another vehicle. The shape detection algorithm can generate output in the form of coordinate points associated with the trailer 212, and the LiDAR system can take this output and provide it as input to an angle estimation algorithm.

The dimensions of the trailer can be provided as input to the truck's LiDAR system (e.g., when the tractor unit is connected to the trailer, during installation of laser scanners, or at some other time). For example, a truck operator may be prompted to enter the dimensions for a trailer. Alternatively, the trailer dimensions could be provided to or obtained by the LiDAR system automatically (e.g., by looking up dimensions for a trailer identified by type or ID number in a database), which may help to avoid problems caused by manual data entry errors.

The locations of the laser scanners can be provided as input to the truck's LiDAR system (e.g., during an initial configuration of the LiDAR system, during installation of laser scanners, or at some other time). Providing the locations of the laser scanners allows the LiDAR system to know where the coordinate origins of the respective laser scanners are, relative to the truck (e.g., relative to a center point or center line the truck). In the examples shown in FIGS. 3 and 4, the rear-mounted scanner 140B is shown as being positioned along the center line 216 of the tractor unit 210, which may allow for simpler calculations. However, other positions of laser scanners can be easily accommodated (e.g., with offset values that represent a distance between the laser scanner and the center line).

In at least one embodiment, the angle estimation algorithm performs the following steps to calculate a cab-trailer angle (e.g., the cab-trailer angles B and C shown in FIGS. 2 and 3):

1. Calculate the angle of the trailer relative to the respective laser scanner, e.g., by calculating a best-fit line through the respective coordinate points;

2. Calculate the orientation of the trailer 212 based on the best-fit line and the trailer dimensions (e.g., width and length); and 3. Calculate the cab-trailer angle as the angle between the calculated trailer orientation and the center line 216 of the tractor unit 210.

The trailer orientation may be represented for the purposes of this calculation by a line, such as the center line 218 shown in FIGS. 2 and 3.

Similar calculations can be performed for vehicles with multiple trailers. For example, with reference to FIG. 5, the respective orientations of trailers 212A and 212B may be represented by the center lines 218A and 218B in calculations of the cab-trailer angle E and the trailer-trailer angle F, respectively. An angle between the tractor unit 210 and the trailer 212B could also be calculated, e.g., by extending the center lines 216 and 218B and calculating the angle between them, or by performing a calculation based on previously calculated angles E and F.

Figure 7:
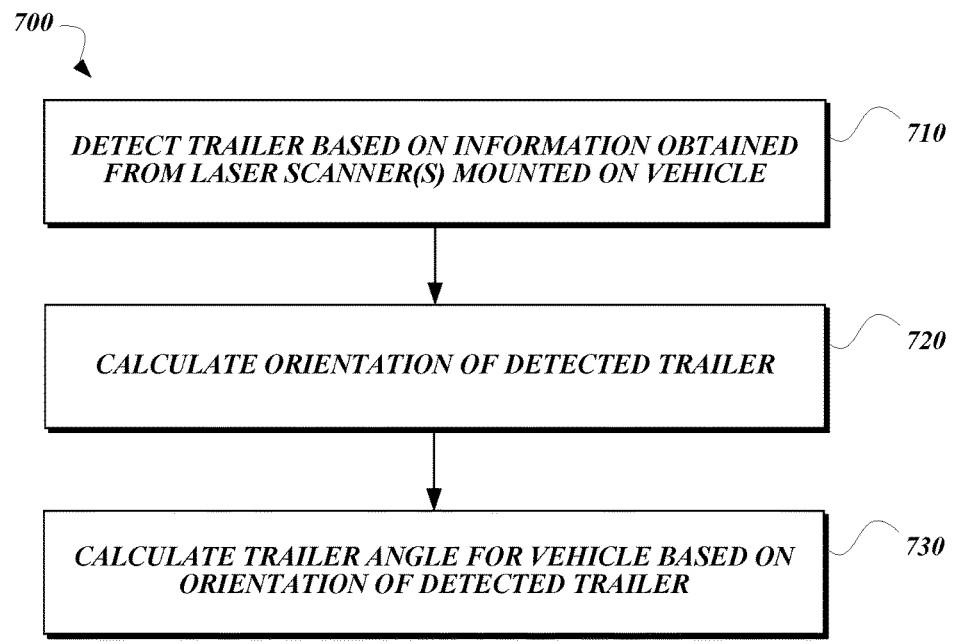
FIG. 7 is a flow chart of an illustrative method that may be implemented by a computer system such as the on-board vehicle computer system of FIG. 1.

FIG. 7 is a flow diagram of an illustrative method 700 that may be implemented by the vehicle computer system 100 described above, or by some other vehicle computer system to calculate a trailer angle in accordance with the present disclosure. At step 710, the system detects a trailer based on information obtained from one or more laser scanners (e.g., side-mounted laser scanners, a rear-mounted laser scanner, etc.) mounted on a vehicle. At step 720, the system calculates the orientation of the detected trailer. For example, an angle detection module calculates the angle of the trailer relative to the respective laser scanner and calculates the orientation of the trailer based on the trailer dimensions (e.g., width and length) and the angle of the trailer relative to the respective laser scanner. At step 730, the system calculates a trailer angle (e.g., a cab-trailer angle) for the vehicle based on the orientation of the detected trailer. For example, the system may calculate the cab-trailer angle as the angle between a line representing the calculated trailer orientation and the center line of a tractor unit.

Many alternatives to the described methods and algorithms are possible. For example, described processing stages can be separated into additional stages or combined into fewer stages. Described processing stages also can be omitted or supplemented with other processing stages. Furthermore, processing stages that are described as occurring in a particular order can instead occur in a different order and/or in a parallel fashion, with multiple components or software processes concurrently handling one or more of the illustrated processing stages. Processing stages that are indicated as being performed by a particular device or module may instead be performed by one or more other devices or modules. For example, in a cloud computing or remote computing arrangement, some processing may be performed locally (e.g., by an on-board vehicle computer system) while other processing may be performed remotely (e.g., by a remote server or other computing device that communicates wirelessly with the on-board vehicle computing system).

Although some of the details described herein are described in the context of particular types of vehicles, such as Class 8 trucks, it should be understood that aspects of the systems and related techniques described herein are applicable to other types of vehicles and vehicle configurations. Systems and techniques described herein may apply to, for example, a light-duty truck towing a boat trailer to facilitate autonomous or computer-guided operation of such a vehicle, e.g., by calculating an angle between the truck and the boat trailer during general operation or when backing a boat trailer to a boat ramp.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A vehicle comprising:
    a tractor unit;
    a first trailer connected to the tractor unit;
    a second trailer connected to the first trailer;
    at least one laser scanner mounted on the tractor unit;
    at least one additional laser scanner mounted on the first trailer; and
    an on-board vehicle computer system communicatively coupled to the at least one laser scanner mounted on the tractor unit and the at least one additional laser scanner mounted on the first trailer, wherein the on-board vehicle computer system is configured to use information obtained from the at least one laser scanner mounted on the tractor unit to calculate a cab-trailer angle for the vehicle, and wherein the on-board vehicle computer system is further configured to use information obtained from the at least one additional laser scanner mounted on the first trailer to calculate a trailer-trailer angle between the first trailer and the second trailer in a multi-trailer configuration;
    wherein calculating the trailer-trailer angle comprises receiving first coordinate points for the first trailer from the at least one scanner mounted on the tractor unit, receiving second coordinate points for the second trailer from the at least one scanner additional mounted on the first trailer, determining a first best-fit line through the first coordinate points, determining a second best-fit line through the second coordinate points, and determining the trailer-trailer angle based on the first best-fit line and the second best-fit line.

2. The vehicle of claim 1, wherein the on-board vehicle computer system further comprises a shape detection module.

3. The vehicle of claim 1, wherein the at least one laser scanner mounted on the tractor unit comprises a side-mounted scanner.

4. The vehicle of claim 1, wherein the at least one laser scanner mounted on the tractor unit comprises a rear-mounted or roof-mounted scanner.

5. The vehicle of claim 1, wherein the on-board vehicle computer system comprises an autonomous operation module configured to use the cab-trailer angle or the trailer-trailer angle to perform an autonomous or computer-guided vehicle maneuver.

6. The vehicle of claim 5, wherein the autonomous or computer-guided vehicle maneuver comprises a parking maneuver.

7. The vehicle of claim 5, wherein the autonomous or computer-guided vehicle maneuver comprises a backing maneuver.

8. The vehicle of claim 1, wherein the at least one laser scanner mounted on the tractor unit comprises at least two side-mounted scanners.

9. The vehicle of claim 8, wherein the at least one laser scanner mounted on the tractor unit further comprises a rear-mounted scanner.

10. The vehicle of claim 1, wherein the at least one additional laser scanner mounted on the first trailer unit comprises a rear-mounted laser scanner.

11. A trailer angle detection system comprising:
    at least one laser scanner configured to be mounted on a tractor unit;
    at least one additional laser scanner configured to be mounted on a first trailer connected to the tractor unit; and
    a vehicle computer system communicatively coupled to the at least one laser scanner mounted on the tractor unit and the at least one additional laser scanner mounted on the first trailer, wherein the vehicle computer system is configured to use information obtained from the at least one laser scanner configured to be mounted on the tractor unit to calculate a cab-trailer angle between the tractor unit and the first trailer, and wherein the vehicle computer system is further configured to use information obtained from the at least one additional laser scanner configured to be mounted on the first trailer to calculate a trailer-trailer angle between the first trailer and a second trailer connected to the first trailer in a multi-trailer configuration;

wherein calculating the trailer-trailer angle comprises receiving first coordinate points for the first trailer from the at least one scanner mounted on the tractor unit, receiving second coordinate points for the second trailer from the at least one additional scanner mounted on the first trailer, determining a first best-fit line through the first coordinate points, determining a second best-fit line through the second coordinate points, and determining the trailer-trailer angle based on the angle between the first best-fit line and the second best-fit line.

12. The trailer angle detection system of claim 11, wherein the vehicle computer system further comprises a shape detection module.

13. The trailer angle detection system of claim 11, wherein the at least one laser scanner configured to be mounted on the tractor unit comprises a side-mounted scanner.

14. The trailer angle detection system of claim 11, wherein the at least one laser scanner configured to be mounted on the tractor unit comprises a rear-mounted or roof-mounted scanner.

15. The trailer angle detection system of claim 11, wherein the vehicle computer system comprises an autonomous operation module configured to use the cab-trailer angle or the trailer-trailer angle to perform an autonomous or computer-guided vehicle maneuver.

16. The trailer angle detection system of claim 15, wherein the autonomous or computer-guided vehicle maneuver comprises a parking maneuver.

17. The trailer angle detection system of claim 15, wherein the autonomous or computer-guided vehicle maneuver comprises a backing maneuver.

18. The trailer angle detection system of claim 11, wherein the at least one laser scanner configured to be mounted on the tractor unit comprises at least two side-mounted scanners.

19. The trailer angle detection system of claim 18, wherein the at least one laser scanner configured to be mounted on the tractor unit further comprises a rear-mounted scanner.

20. The trailer angle detection system of claim 11, wherein the at least one additional laser scanner configured to be mounted on the first trailer comprises a rear-mounted laser scanner.

* * * * *